June 19, 1923. 1,458,930
J. F. FLAHERTY
SPINDLE DRIVING MECHANISM
Filed March 26, 1921 2 Sheets-Sheet 1
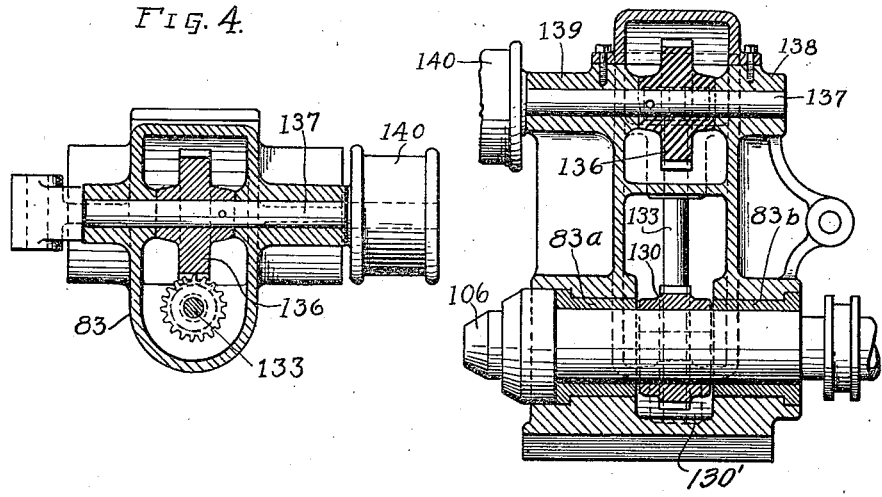
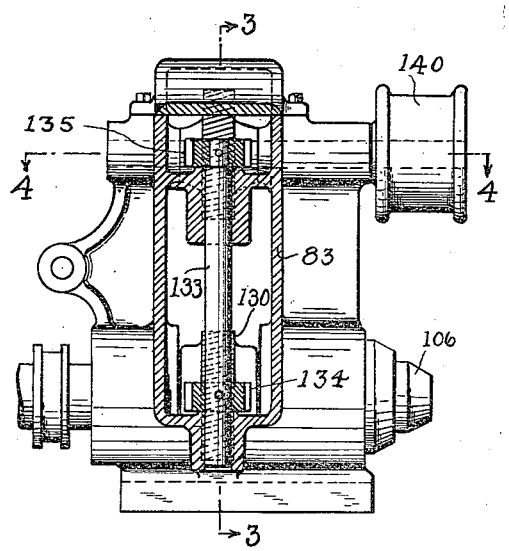
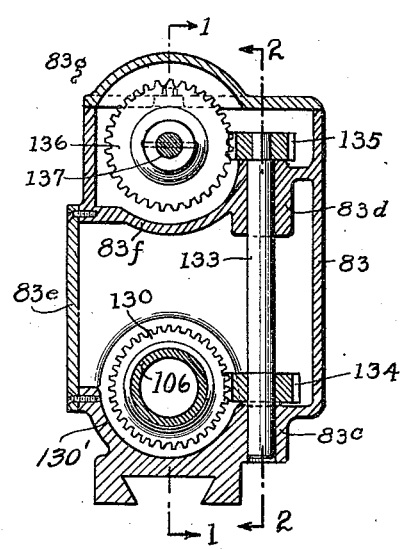
Inventor
J. F. FLAHERTY.
Attorney June 19, 1923.
J. F. FLAHERTY
1,458,930
SPINDLE DRIVING MECHANISM
Filed March 26, 1921    2 Sheets-Sheet 2
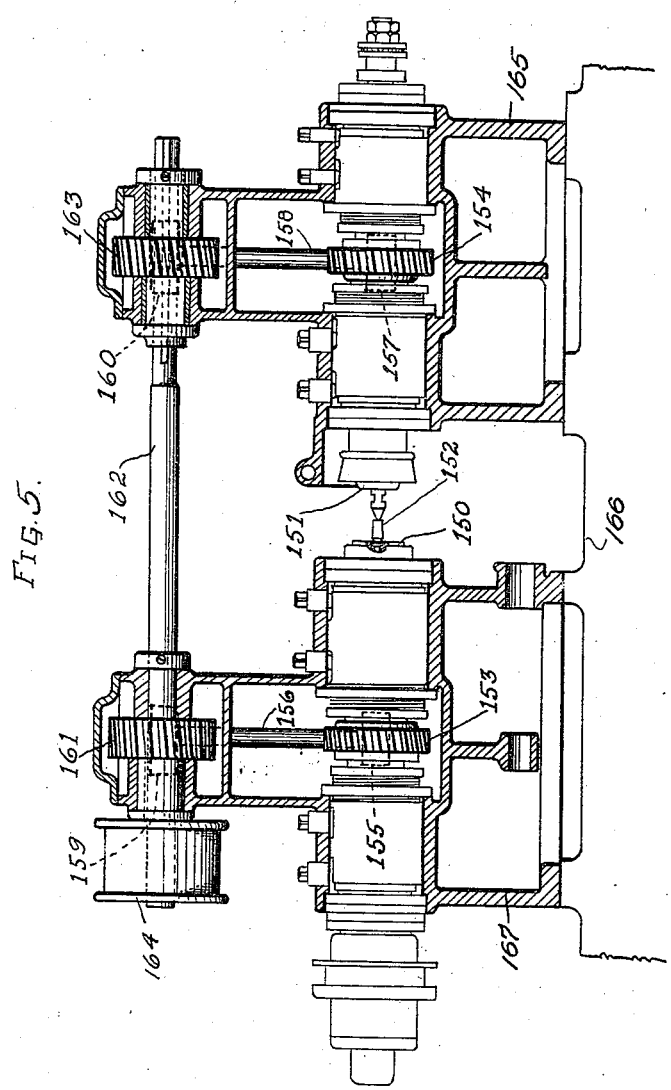
INVENTOR.
J. F. FLAHERTY.
Attorney.

Patented June 19, 1923.

1,458,930

UNITED STATES PATENT OFFICE.

JOHN F. FLAHERTY, OF TOLEDO, OHIO, ASSIGNOR TO THE BOCK BEARING COMPANY, OF TOLEDO, OHIO, A CORPORATION OF OHIO.

SPINDLE-DRIVING MECHANISM.

Application filed March 26, 1921. Serial No. 455,836.

*To all whom it may concern:*

Be it known that I, JOHN F. FLAHERTY, a citizen of the United States, and a resident of Toledo, county of Lucas, State of Ohio, have invented new and useful Improvements in Spindle-Driving Mechanism, of which the following is a specification.

This invention relates to driving mechanism and more particularly to work-spindle driving mechanism for grinding machines. One of the objects of the invention is to provide a driving mechanism that will be extremely steady so as to avoid irregularities in the work performed.

Another object of the invention is to provide a spindle driving mechanism adapted for belt drive and yet not possessing the disadvantages inherent in spindles that are directly driven by means of a belt.

Other objects and the features of novelty will be apparent from the following description taken in connection with the accompanying drawings, in which:—

Figure 1 is a vertical section through a spindle driving mechanism embodying the invention, the section being taken on the line 1—1 of Fig. 3;

Fig. 2 is a vertical section taken on the line 2—2 of Fig. 3;

Fig. 3 is a vertical section taken on the line 3—3 of Fig. 2;

Fig. 4 is a horizontal section on the line 4—4 of Fig. 2.

Fig. 5 is a longitudinal section through a double spindle driving mechanism embodying my invention.

This application is in part a division of my co-pending application No. 395,539, filed July 12, 1920 and the invention described and claimed herein has reference to the mechanism for driving the work-spindle of the grinding machine disclosed in said application No. 395,539.

Referring now to the drawings it will be noted I have illustrated a housing 83 in which the bearings 83ª and 83ᵇ are arranged to receive the work-spindle 106. The bearings 83ª and 83ᵇ are spaced apart as shown in Fig. 1 and the spindle 106 carries, in the space between the bearings, a worm gear 130 by means of which the spindle 106 is rotated. The housing 83 is formed with a lubricant chamber 130' around the gear 130 and the latter, by its rotation, supplies lubricant to the bearings 83ª and 83ᵇ. The upper part of the housing 83 is provided with the bearings 138 and 139 for a driving shaft 137 which carries the driving pulley 140. Between the bearings 138 and 139 the shaft 137 carries a worm 136 which is keyed or otherwise secured to the shaft so as to be rotated thereby.

A vertical shaft 133 is also arranged in the housing 83 and is mounted in the bearings 83ᶜ and 83ᵈ. The shaft 133 carries at its lower end a worm 134, which meshes with the gear 130, and carries at its upper end, a worm gear 135 which meshes with the worm 136, and thus acts as an intermediate shaft for transmitting the drive from the shaft 137 to the spindle 106.

It will be noted from the Fig. 3 that the housing 83 closely conforms to the lower part of the gear 130 and forms a chamber for lubricant for the gears 130 and 134. A suitable cover plate 83ᵉ is provided on the side of the housing 83 to give access to the gears 130 and 134. A partition 83ᶠ is arranged across the interior of the housing 83 to form a lubricant chamber for supplying the gears 135 and 136 and a cover plate 83ᵍ on the top of the housing permits access to these gears.

In the operation of the mechanism the pulley 140 will be driven by a belt in the usual manner and the power transmitted through the gearing and the intermediate shaft 133 to the work-spindle 106, the gearing absorbing the slight irregularities in the rotative speed of the shaft 137 due to vibration or flapping of the driving belt. This together with the means for lubricating the gears which have been provided, results in unusual uniformity in the rotative speed of the work-spindle.

In the mechanism illustrated in Figure 5, two axially aligned spindles 150 and 151 which support the work 152 are driven by the worm gears 153 and 154, respectively. The gear 153 is driven by a worm 155 on an intermediate shaft 156 and the gear 154 is driven by a worm 157 on an intermediate shaft 158, these drives being similar to the arrangement shown in Figures 1 to 4. As in the construction illustrated in Figures 1 to 4, each of the shafts 156 and 158 has a worm gear at its upper end, indicated respectively by the numerals 159 and 160. The worm gear 159 meshes with a worm 161 on shaft 162 which is parallel with the spindles 150 and 151 and the worm gear 160 meshes with a worm 163 which is splined on this same shaft and movable longitudinally thereof. The shaft 162 is driven by a pulley 164. The housing 165 which carries the spindle 151 is adjustable axially of said spindle on the bed 166, relative to the housing 167, which carries the spindle 150, to vary the distance between the cooperating ends of the spindles, the splined arrangement of the gear 163 on the shaft 162 permitting this gear to be adjusted with the housing 165 without affecting the drive.

With similar gear ratios for the drives for the spindles 150 and 151 it will be evident the arrangement provides a smooth running drive for each spindle and also insures perfect synchronism. I have herein referred to the various gears as a "worm" or "worm gear" although such gears might also be designated by the more general term of "spiral gear" which I have employed in the claims.

While I am aware that spiral gears are commonly used yet I believe that the use of these gears as shown in a mechanism for indirectly driving the work-spindle of a grinding machine, is new, and although I have shown a specific embodiment of my invention I desire to have it understood that I claim such modifications as come within the spirit of the invention as defined in the appended claims.

Having thus described my invention, what I claim is:—

1. In a grinding machine, the combination of a housing, a work-spindle mounted in spaced bearings in said housing, a driven gear on said spindle between said bearings, said housing being formed with a lubricant chamber around said driven gear from which said gear and said bearings are supplied with lubricant, a drive shaft arranged in a plane parallel with the plane of said spindle and mounted in spaced bearings in said housing, a spiral gear on said shaft between the last-mentioned bearings, an intermediate shaft, gears on said intermediate shaft meshing respectively with said spiral gears, and said housing having a partition therein forming a lubricant chamber from which the second-mentioned spiral gear and the gear meshing therewith are lubricated.

2. In a grinding machine, the combination of two axially aligned cooperating work spindles, a separate intermediate drive shaft for each spindle arranged at right angles thereto, spiral gearing between each of said shafts and its spindle, a drive shaft arranged parallel with said spindles, a pair of spiral gears between said drive shaft and each of said intermediate shafts, one of which has a splined connection with said drive shaft, and relatively adjustable housings for each of said work spindles and the gearing whereby it is driven from said drive shaft.

In testimony whereof I affix my signature.

JOHN F. FLAHERTY.